(12) United States Patent
Martinez et al.

(10) Patent No.: US 11,017,677 B2
(45) Date of Patent: May 25, 2021

(54) DECISION-MAKING AID FOR REVISING A FLIGHT PLAN

(71) Applicant: THALES, Courbevoie (FR)

(72) Inventors: Dorian Martinez, Toulouse (FR); Emilie Bies, Toulouse (FR)

(73) Assignee: THALES, Courbevoie (FR)

( * ) Notice: Subject to any disclaimer, the term of this patent is extended or adjusted under 35 U.S.C. 154(b) by 252 days.

(21) Appl. No.: 15/700,156

(22) Filed: Sep. 10, 2017

(65) Prior Publication Data

US 2018/0075758 A1 Mar. 15, 2018

(30) Foreign Application Priority Data

Sep. 13, 2016 (FR) ...................... 1601342

(51) Int. Cl.
*G08G 5/00* (2006.01)
*G01C 21/20* (2006.01)
*G01C 23/00* (2006.01)
*G06Q 10/04* (2012.01)

(52) U.S. Cl.
CPC .......... *G08G 5/0039* (2013.01); *G01C 21/20* (2013.01); *G01C 23/00* (2013.01); *G06Q 10/04* (2013.01); *G08G 5/0013* (2013.01); *G08G 5/0026* (2013.01); *G08G 5/0047* (2013.01); *G08G 5/0052* (2013.01)

(58) Field of Classification Search
CPC ........ G08G 5/003; G08G 9/00; G08G 5/0039; G08G 5/0052; G08G 5/0026; G08G 5/0047; G08G 5/0013; G01C 23/00; G01C 21/20; G06Q 10/04; G06G 10/04
See application file for complete search history.

(56) References Cited

U.S. PATENT DOCUMENTS

| | | | | |
|---|---|---|---|---|
| 6,134,500 A * | 10/2000 | Tang | ...................... | G06Q 10/047 701/10 |
| 7,877,197 B2 * | 1/2011 | Lewis | .................. | G08G 5/0034 701/120 |
| 8,463,535 B2 * | 6/2013 | Torres | .................. | G08G 5/0039 701/120 |
| 9,542,851 B1 * | 1/2017 | Kim | ...................... | G08G 5/0047 |
| 2007/0050098 A1 * | 3/2007 | Caillaud | ................ | G01C 23/00 701/3 |

(Continued)

FOREIGN PATENT DOCUMENTS

EP 2 267 683 A2 12/2010
EP 2 975 361 A1 1/2016

*Primary Examiner* — Rami Khatib
(74) *Attorney, Agent, or Firm* — BakerHostetler (57) ABSTRACT

A method is provided for managing the revising of a flight plan of an aircraft implemented by at least two systems, one being of avionics type (qualified, certified) and the other not. From a flight plan, flight plan revisions are determined, even assessed, then one or more of these revisions are selected and/or combined. Subsequently, these combinations are processed by the avionics system and the corresponding avionics parameters are calculated. By comparing the different results of avionics quality, the impact of each revision can be quantified then rendered to the pilot to assist in his or her decision-making, in particular with regard to negotiating the revisions with air traffic control. Combinatorial optimization and learning steps are described, as are system and software aspects.

12 Claims, 5 Drawing Sheets

(56) References Cited

U.S. PATENT DOCUMENTS

| | | | | |
|---|---|---|---|---|
| 2008/0036659 | A1* | 2/2008 | Smith | G01S 13/765 |
| | | | | 342/454 |
| 2010/0152927 | A1 | 6/2010 | Sacle et al. | |
| 2010/0198433 | A1* | 8/2010 | Fortier | G01C 23/00 |
| | | | | 701/14 |
| 2013/0080043 | A1* | 3/2013 | Ballin | G08G 5/0034 |
| | | | | 701/120 |
| 2014/0365041 | A1* | 12/2014 | Deker | G05D 1/0607 |
| | | | | 701/4 |
| 2015/0370251 | A1* | 12/2015 | Siegel | G05D 1/0027 |
| | | | | 701/2 |
| 2016/0019793 | A1* | 1/2016 | Fournier | B64D 45/00 |
| | | | | 701/400 |
| 2016/0019795 | A1 | 1/2016 | Chircop et al. | |
| 2016/0078769 | A1* | 3/2016 | Coulmeau | G01C 21/20 |
| | | | | 701/537 |
| 2016/0093217 | A1 | 3/2016 | Hale et al. | |
| 2016/0163201 | A1* | 6/2016 | Le Merrer | G08G 5/003 |
| | | | | 701/4 |
| 2016/0163202 | A1* | 6/2016 | Marion | G08G 5/0047 |
| | | | | 701/3 |
| 2016/0379500 | A1* | 12/2016 | Garrido Lopez | G05D 1/101 |
| | | | | 701/16 |
| 2017/0323274 | A1* | 11/2017 | Johnson | G05B 13/041 |

* cited by examiner

DECISION-MAKING AID FOR REVISING A FLIGHT PLAN

CROSS-REFERENCE TO RELATED APPLICATIONS

This application claims priority to foreign French patent application No. FR 1601342, filed on Sep. 13, 2016, the disclosure of which is incorporated by reference in its entirety.

FIELD OF THE INVENTION

The invention relates to the technical field of embedded systems in avionics, and more particularly the methods and the systems for managing the flight of an aircraft.

BACKGROUND

The airlines generally seek to reduce their operating costs while ensuring a high quality of service, and to do so without degrading safety rules.

For this, the airlines define a "company policy" as being the weighting of numerous criteria comprising in particular the operational cost of the flight, flight duration, reliability, safety, environment, customer satisfaction, personnel availability, maintenance or even the life of the aeroplane.

An airline and the pilot can negotiate flight plan "revisions" (before or during the flight) with the air navigation and control authorities to optimize the flight plan (in particular) with respect to this company policy. The pilot or the company must then be able to identify the revisions to be proposed and must also be able to determine the optimal revision for the flight.

The patent document FR2939917 discloses a method for optimizing the flight of an aircraft comprising the calculation of cost indices and speed setpoints. The method determines in particular fuel consumptions and different consumption deviations. However, this document does not deal with the issue of aircraft flight plan revisions.

The existing solutions for managing flight plan revisions for their part exhibit limitations.

SUMMARY OF THE INVENTION

The invention improves the situation by proposing a method for the revising of a flight plan of an aircraft implemented by at least two systems, one being of avionics type (qualified, certified) and the other of non-avionics type. From a flight plan, flight plan revisions are determined, even assessed, then one or more of these revisions are selected and/or combined. Subsequently, these combinations are processed by the avionics system and the corresponding avionics parameters are calculated. By comparing the different results of avionics quality, the impact of each revision can be quantified then rendered to the pilot to assist him or her in his or her decision-making, in particular with respect to negotiating revisions with air traffic control. Combinatorial optimization and learning steps are described, as are system and software aspects.

Advantageously, the invention optimizes the use of the critical resources, in particular the F.M.S. (Flight Management System) certified flight management system (or function) which is a so-called "avionics" or "critical" or "qualified" or "certified" system.

Advantageously, the invention allows the re-use of the existing capabilities of an F.M.S. system or function to benefit a client application, which is not of avionics nature (not certified, not critical). This client application can request then manipulate trajectory calculations performed by the flight management system (or F.M.S. function), obtain prediction calculations or various other operations (e.g. OMD creation NAVDB function, flight scheduling, etc.).

Advantageously, the advantageous re-use of the certified avionics calculations makes it possible to manipulate flight plans and flight plan revisions which are compatible—by construction—with the certified F.M.S. system. In particular, the revisions proposed by the methods and the systems according to the invention will be able to be applied by the F.M.S. system. Thus, the risk of rejection of a flight plan revision is minimized. The assessments of the flight plans presented by the methods and the systems according to the invention will be able to be the same as those calculated by the flight management system F.M.S., after application of the revision in this F.M.S.

Advantageously, the invention can be implemented on one or more non-critical systems (in particular arranged in parallel, redundantly or even concurrently). The large number of calculations required to determine the gain (positive or negative) of each revision (or combination of revisions) can limit the impact on the performance levels of the embedded system. Using non-critical systems according to the invention makes it possible to advantageously use the critical resources.

Advantageously, the invention can further optimize the development costs which would otherwise be prohibitive in the existing critical avionics systems. The critical avionics systems have high software development costs associated with the certification requirements. The higher the level of criticality of the system, in terms of dependability according to the international standards RTCA D0178C (USA) and EUROCAE ED-12C (Europe), the higher its development cost. A decision-making aid function, currently incorporated in one of the existing critical computers (F.M.S. or PA), would result in a development cost ten to one hundred times higher than its cost in an environment of low criticality, in the way of the invention.

Advantageously, the decoupling into a plurality of systems and the preservation of the critical avionics system that is the flight management system F.M.S. simplifies the maintenance thereof. The various systems interacting can evolve more independently.

Advantageously, the invention exhibits a fast learning curve. In addition to the development costs, the insertion of new functions into an existing critical architecture generally leads to complex solutions between the systems, which generate a learning load ("training") for the crews and for the maintenance teams, and also increases the risk of error in the manipulation of the equipment items to perform the function concerned. Moreover, the software and mathematical optimization techniques that make it possible to obtain fast results can be difficult to certify (e.g. fuzzy logic).

The invention also makes it possible to perform reliable and realistic comparisons between comparable flight plans. In effect, in one embodiment, each revision is scored according to several criteria (cost, punctuality, etc.) as a function of the initial flight plan. According to the invention, the flight plans compared are created from the same postulates or algorithms, which makes it possible to obtain reliable classifications (by contrast, comparisons between flight plans constructed by the F.M.S. and by non-F.M.S. third-party systems would be difficult to consider). The flight plans proposed by non-F.M.S. systems can in fact be different after insertion into the F.M.S. (e.g. trajectories, predictions, observance of the constraints in the broad sense, etc.).

Advantageously, the gains determined according to the invention can be assured after revision, which is not necessarily the case if the revisions are calculated outside of the flight management system F.M.S. For example, a non-F.M.S. proposed flight plan cannot be negotiated by using the systems dedicated to F.M.S. flight plan negotiations, like the datalink communication link with air traffic control ATC.

In one embodiment, the proposed method classifies the revised flight plans by giving a score to each flight plan, possibly as a function of the company policy (i.e. the list can comprise a plurality of criteria, of heterogeneous nature, by allowing, for example, weightings between these criteria).

Advantageously, one or more gains (or benefits or scores) associated with one or more flight plan revisions can be determined. The invention can calculate the gain (or benefit) of a so-called individual revision in relation to one or more predefined criteria (just one, some or all the criteria). The revisions can be classified, in particular according to a predefined company policy (for example by the application of rules or thresholds). A flight presented by the F.M.S. is not necessarily flown effectively. If necessary, the actual gains are those which were expected (by construction).

Advantageously, the revisions determined according to the invention can be compatible with the F.M.S. and the non-avionics information, such as the mapping of the air space, the ATC regulations, density of the air space, meteorological conditions, route or airport or runway closed, T.S.A. meaning "Temporary segregated area", T.R.E meaning "Temporary reserved area", terrain constraints, personnel or maintenance constraints, etc.

The invention further optimizes the observance of the airline (aircraft operator) policy management rules and/or takes account of one or more external (environment) and internal (aeroplane status) constraints.

Moreover, according to the invention, once the negotiation is accepted by air navigation control, the revision can be applied to the flight plan without any work overload.

Advantageously, the invention can use non-avionics information. The assessments performed on the modified flight plans can therefore be rich or complex. These assessments can take account of a large number of factors, which can be diverse. Weightings of criteria or of assessment factors in particular allow for a flexible overall assessment. Any new "exogenous" criterion is generally easy to incorporate, through assessment factors of non-avionics type.

The method according to the invention also makes it possible to better negotiate with air traffic control. To optimize the flight plan, it can be advantageous to combine individual revisions. According to one aspect of the invention, the pilot is informed of the individual revisions, which are also classified or ordered, according to different orders. The pilot can then best negotiate the revisions to be flown with air traffic control.

BRIEF DESCRIPTION OF THE DRAWINGS

Other features and advantages of the invention will become apparent from the following description and from the figures of the attached drawings in which.

DETAILED DESCRIPTION

A "computer" denotes a computer of conventional architecture of Von Neumann type, that is to say comprising in particular computation means (i.e. at least one processor). Alternatively, the term "server" can be used (from a hardware definition viewpoint).

According to some embodiments, a method is proposed for managing the revising of a flight plan of an aircraft implemented by at least two systems, the first system being an avionics flight management system of F.M.S. type and the second interacting with the first avionics system being of non-avionics type, the method comprising the steps consisting in:—receiving a flight plan;—in the second, non-avionics system, determining a plurality of revisions of the flight plan received;—in the first, avionics system, determining the avionics parameters corresponding to the revised flight plans associated with combinations of the revisions having been determined;—in the second, non-avionics system, comparing the duly determined avionics parameters and assessing the impact of at least one revision of the flight plan.

The flight plan can be received in the first and/or the second system.

The avionics system can be a "qualified" or "critical" flight management system and the non-avionics system is a "non-qualified" or "non-critical" system.

In one embodiment, the two systems are both embedded on board the aircraft. As a variant, they can both be situated on the ground. In a particular embodiment, one system may be located on board whereas another system may be located on the ground. In other embodiments, the perimeters of these two systems can be more complex (a large number of hardware entities cooperating and implementing software services) and can in particular be distributed in space.

In one embodiment, in the second, non-avionics system:
a plurality of revisions of the flight plan is determined or received;
a plurality of combinations of duly determined revisions is then determined in the second, non-avionics system;
one or more of the combinations of revisions is/are assessed in the second, non-avionics system as a function of predetermined criteria;
one or more of the combinations of revisions that have been assessed is/are selected.

In the first, avionics system, the parameters of the flight plans (corresponding to the insertions of the combinations of flight plan revisions having been assessed then selected) can be finally determined.

The flight plan parameters determined by the first, avionics or qualified or certified system can finally be communicated to the second, non-certified or non-critical or non-avionics system, which can then perform various comparisons (arithmetical, statistical, etc.) on these avionics results, in order for example to isolate the impact or the influence or the cost of one or more particular revisions.

In another embodiment:
in the second, non-avionics system, at least one revision of the flight plan received is determined;

in the first, avionics system, the avionics parameters corresponding to the revised flight plan associated with at least one determined revision are determined;

in the second, non-avionics system, the determined avionics parameters are compared and the impact of at least one revision of the flight plan is assessed.

In another embodiment, a plurality of revisions can be manipulated. In particular, the revisions are manipulated by combinatorial mathematics. According to this embodiment:

in the second, non-avionics system, a plurality of combinations of revisions of the flight plan received is determined;

in the first, avionics system, the avionics parameters corresponding to the revised flight plans associated with the different combinations of revisions are determined;

in the second, non-avionics system, the determined avionics parameters are compared (for example two-by-two) and the impact of each revision of the flight plan is assessed.

For example, four revisions A, B, C and D may be determined. A selection of these revisions can lead to considering the revisions B, C and D only. Different combinations of these revisions, for example B-D, C-D and B-C-D, can be determined. In some cases, the order of the revisions must be taken into account: the flight plans revised according to B-D and according to D-B may not be identical. The number of arrangements of k elements selected out of n will then be A(n,k)=n!/(n–k)! In some cases, the order of the revisions is immaterial and the number of combinations will then be A(n, k)/k!

The interaction between the first system and the second system can be bilateral: the supplying FMS supplies avionics services on request from the client server.

The avionics parameters of the flight plans calculated by the FMS can comprise in particular fuel consumption predictions and times of passage at predefined flight plan points.

The calculations of the FMS can be compared in different ways (e.g. arithmetical, of subtraction and/or statistics type, of mean analysis type, of variance or deviation, ACP analysis, analysis of distributions, etc.). By comparing these results, the impact or the consequence of one or more (or of each) of the revisions can be quantified or assessed.

In one development, the combination of revisions can be determined as a function of predefined criteria.

These criteria can comprise numeric conditions (e.g. values, thresholds, etc.) and/or logic rules that are predefined. The revisions considered by the method according to the invention observe default or assumed flyability criteria. The combinations of these revisions can advantageously be tested before manipulation by the method. The conditions can be numeric (values, facts) and/or logic rules operating on these values. The logic rules can in particular and for example be derived from a database of non-avionics type, and are, for example, representative of an airline policy. By contrast, flight plans that do not satisfy predefined strict constraints can be eliminated or disregarded. Various data sources, avionics or non-avionics, can be taken into account.

In one development, the combination of revisions minimizes the negotiation time with the air traffic control ATC authority, the time being estimated from times measured in the past or being estimated for the future.

For example, the aggregate of the individual times can be determined. It is possible to minimize the total of the negotiation times of several revisions.

More generally, the combination of revisions can optimize the observance of one or more predefined criteria comprising in particular the fuel cost, the flight time, the punctuality of the flight, the operational flight cost, the availability of navigating personnel, the availability of aeroplanes and of maintenance equipment, environmental criteria, the observance of company rules AOC and regulatory rules ATC, the facility to implement in terms of AOC and/or ATC negotiation or of cognitive workload for the pilot, these latter values having been quantified and historicized, the reduction of the meteorological risks, the reliability of one or more revisions in time, or the air spaces to be avoided.

In one development, the method further comprises the step consisting in quantifying and displaying the impact of a revision of the flight plan.

The revisions considered in isolation can be quantified (or assessed or estimated).

In one development, the method further comprises the step of receiving the selection of a revised flight plan out of several, the revised flight plan comprising a particular combination of revisions.

Optionally, the application computer can save the selection made by the pilot in order to enrich a knowledge base intended for automatic learning.

The selection can be made by man and/or machine.

In one development, the method can further comprise the step of communicating to air traffic control ATC a request to authorize flying a flight plan associated with a particular combination of revisions.

An integrated feedback loop with air traffic control can be one of the steps of the method. In practice, a datalink communication can be used.

In one development, the method further comprises a step of inserting the selected and/or authorized flight plan into the flight management avionics system.

In one development, a flight plan can be associated with N constraints, the method further comprising the step consisting in determining, in the first, avionics system, the avionics parameters associated with different combinations of the flight plans with N-k constraints, k varying from 1 to N–1.

A flight plan (revised or not) can in fact be considered as an object or set of N constraints (e.g. lateral, vertical, performance and flight envelope related).

The relationship between "revision" and "constraint" is described hereinbelow. The revisions generally designate piloting operations (e.g. inputs) and the constraints are physical parameters used in the trajectory or flight plan calculations. The input of a revision (e.g. by the pilot) can lead to one or more constraints. One and the same constraint can be associated with one or more revisions. The pilot inputs the flight plan "revisions", the F.M.S. avionics system manipulates and determines flight constraints, i.e. physical parameters. It is possible to translate or associate given flight constraints into or with revisions and vice-versa. There are therefore (deterministic) relationships between revisions and constraints.

In one development, the number of constraints of the flight plans can be progressively decremented, the nature of a subtracted constraint being immaterial.

In one development, the number of constraints of the flight plans is progressively decremented, according to a predefined order as to the nature of the constraints.

In one development, the method further comprises the step consisting in assessing the impact of a previously selected constraint.

In one development, the revisions or the combination of the revisions of the flight plan are/is a function of the flight context and/or are/is determined by learning.

The use of the flight context makes it possible to reduce the combinatorial mathematics, to reduce the space of the possibles to the steps consisting in generating, combining, filtering, assessing, classifying, selecting the revisions (or the combinations of revisions) and/or the operations conducted on the results of the avionics calculations. The learning can be supervised or unsupervised. In the computer field, the unsupervised learning (sometimes called "clustering") is an automatic learning method.

A computer program product is disclosed, said computer program comprising code instructions making it possible to perform one or more of the steps of the method, when said program is run on a computer.

A system is disclosed for implementing one or more of the steps of the method, the system comprising a flight management system of F.M.S. avionics type. In one development, the system comprises a non-avionics system of electronic flight bag or E.F.B. type, or a digital tablet (or AOC/ATC equipment items).

Figure 1:
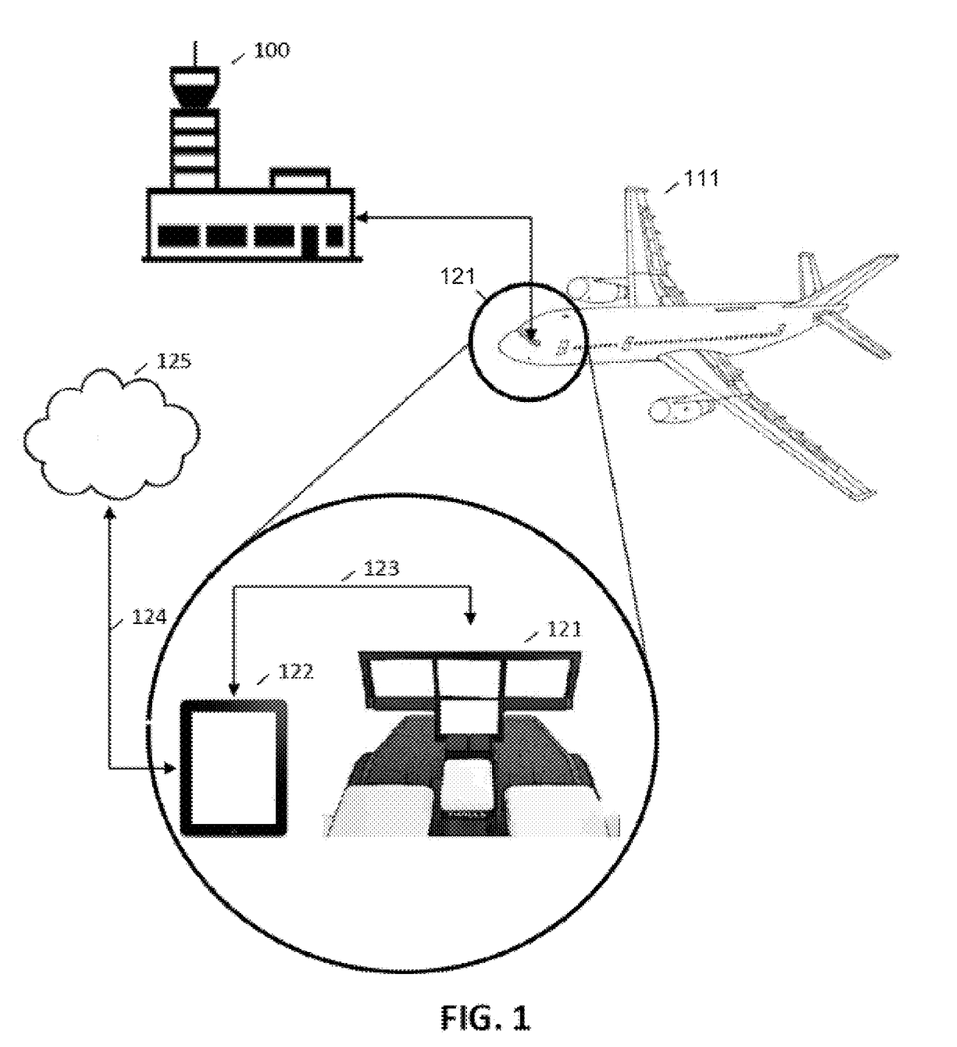
FIG. 1 illustrates the overall technical environment of the invention.

FIG. 1 illustrates the overall technical environment of the invention. AOC/ATC computers 100 (for example a control tower linked with the air traffic control systems) are in communication with an aircraft 111. An aircraft is a transport means capable of moving around in the Earth's atmosphere. For example, an aircraft can be an aeroplane or a helicopter (or even a drone). The aircraft comprises a cockpit 121. In the cockpit there are piloting equipment items 121 (called avionics equipment items), for example comprising one or more on board computers (computation, memory and data storage means), including an F.M.S., display or visualization or data input means, communication means, and, possibly, haptic feedback means. A tablet or an E.F.B. (Electronic Flight Bag) 122 can be located on board, portable or incorporated in the cockpit. An E.F.B. is often called or described as an equipment item of "open (world)" type (i.e. non-avionics or non-qualified or non-certified), unlike the equipment items of "avionics" type (certified by the regulator). An E.F.B. can interact (bilateral communication 123 or else unilaterally) with the avionics equipment items 121. The E.F.B. can also be in communication 124 with external computing resources, accessible via the network (for example cloud computing 125). In particular, the calculations can be performed locally on the E.F.B. or partly or totally in the computation means accessible via the network. The on board equipment items 121 are generally certified and regulated whereas the E.F.B. 122 and the connected computing means 125 are generally not (or are to a lesser degree). This architecture makes it possible to inject flexibility on the side of the E.F.B. 122 by ensuring controlled security on the side of the embedded avionics 121.

Figure 2:
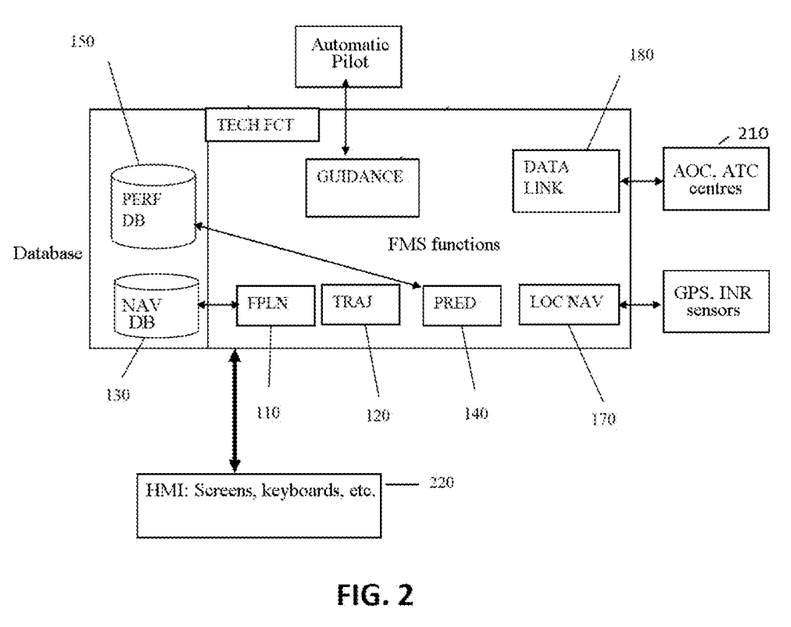
FIG. 2 schematically illustrates the structure and the functions of a flight management system of known F.M.S. type.

FIG. 2 schematically illustrates the structure and the avionics functions of a flight management system of known F.M.S. type.

The F.M.S. is generally connected to many other computers (a hundred or so), which can also implement one or more steps of the method according to the invention (for example, the management of conditional access to granular avionics services can advantageously consolidate sparse avionics resources). FIG. 2 represents an F.M.S. having in particular avionics functions, in particular navigation LOC-NAV 170, flight plan FPLN 110, navigation database NAVDB 130, performance database PRF DB 150, lateral trajectory TRAJ 120, predictions PRED 140, guidance GUID 200 and digital data link DATALINK 180 for communicating with the control centres and other aircraft (the integrated feedback loops with the steps of the method according to the invention can use this communication channel). The F.M.S. comprises or can be associated with human-machine interfaces 220 (e.g. computer screens, augmented reality, virtual reality, haptic feedback, projectors, etc.).

One or more systems of non-avionics type can access the avionics FMS for example via the HMIs 220 and/or by computers (210, 100) of AOC (airline) and/or ATC (air traffic control) type.

Figure 3:
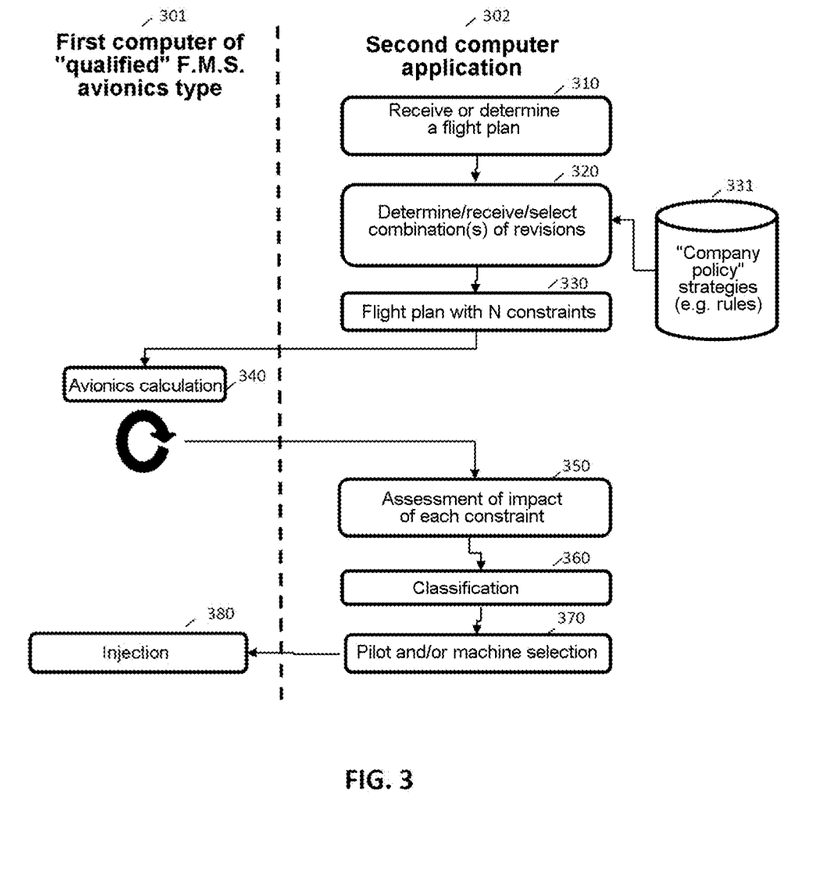
FIG. 3 illustrates examples of steps of the method according to an embodiment of the invention.

FIG. 3 illustrates examples of steps of the method according to an embodiment of the invention.

In one embodiment, the system according to the invention comprises at least two computers 301 and 302.

The computer 302 (or an assembly of calculators or computers outside the F.M.S. 301), at step 320, determines combinations of revisions, selects and/or assesses some of them and can finally classify the different revised and/or selected and/or assessed flight plans (with revisions or combinations of revisions). The second, mission management computer 302 is connected to the first computer. The second computer 302 executes one or more avionics applications. Optionally, the second computer comprises or is associated with one or more databases (e.g. notations base and a strict constraints base). In one embodiment, the computer 302 is an E.F.B.

In one embodiment, the computer 301 can be of F.M.S. type, i.e. allows trajectory or flight plan calculations according to certified methods (accepted or validated by the regulator). In avionics, the flight management systems F.M.S. are certified by the F.A.A. (Federal Aviation Administration). The F.M.S. computer can calculate the complete parameters of the revised flight plans. These revised flight plans are applicable to all the databases of the F.M.S. (NAVDB, PerfDB, Magyar, etc.) and are calculated from aeroplane data (weights, altitude, position, wind, etc.).

This computer 301 (possibly consisting of subsystems not represented) produces flight plan revisions which are reliable and/or valid, inasmuch as these revisions "by nature" observe the different aeronautical standards. The resources of a "qualified" or "certified" F.M.S. avionics system are precious inasmuch as the calculations which are performed by this system have official value. The computer 301 allows trajectory or flight plan calculations according to methods that are "certified" or "qualified" (i.e. accepted or validated by the regulator).

This avionics computer 302 is generally of "high criticality" (the software development level DO178C lies between the so-called "major" level, i.e. level C, with a maximum error over 100 000 flying hours up to the so-called "hazardous" level, i.e. level B, with a maximum critical error for ten million flying hours). In order to obtain such criticality, this type of computer can use a hardened hardware, of high reliability, having long exposure. In practice, this type of computer can be of former generation, i.e. with processor (CPU) and memory (RAM/ROM) resources significantly lower than a computer available to the public but requiring lesser software development. Generally, the addition of consumer software functions to the avionics systems is controlled, in order to guarantee to the utmost a deterministic and a priori demonstration of the qualities required of the software. The additions of advanced functionalities and/or the various algorithmic optimizations can be non-deterministic in terms of response times and are therefore very difficult and costly to incorporate in the avionics systems.

In one embodiment, the computer 301 can form a plurality of generic open services. A flight management F.M.S. computer can in fact provide avionics "services" (for example according to an open client-service architecture). In one embodiment, an F.M.S. computer can supply one or more avionics applications calling one or more unitary services. An "open" F.M.S. system or F.M.S. function is an F.M.S. or F.M.S. function offering services (i.e. acting as "server" for "clients") in a "client-server" architecture, characterized in that it offers an a priori indeterminate number of anonymous or known clients access to its services. It generally comprises the following elements: a front page of services offered, returning responses to the client, a quality of service offered by service and by type of client (response time, CPU, accuracy/reliability), memory allocated for storing calls and the results of the requests from the different clients, a filtering of accesses determined as a function of the type and of the number of clients to guarantee that its intrinsic performance levels are maintained.

In one embodiment, the "core" of the F.M.S. computer is of open type. For example, its methods and/or constraints are published or public. The interfaces of the private services are accessible. Technically translating this open architecture can in particular be explained through programming interfaces (for example APIs) allowing accesses (e.g. according to variable modalities) to the avionics services of the certified and regulated flight management system.

In a specific embodiment, the open architecture of the F.M.S. is characterized technically in that it comprises four interacting parts (not represented in the figures): a) a functional avionics core, that is to say a subset of the system which implements the functional services and the avionics services of the flight management system, b) an interaction model (and its declinations) and protocols allowing a user or pilot to invoke this functional core, c) an information system making it possible to manage the data or the connections and d) one or more hardware platforms for executing different avionics services. In other words, an open flight management system 301 decouples the flight management core from the clients of this core, the decoupling interface being made for example by managing an intermediate layer between the F.M.S. and the client, authorizing or prohibiting the calls to the computing resources.

An avionics system according to the invention (avionics, qualified, certified) is generally real time and architectured and developed to meet performance requirements (failure rate and quality of service in particular) in a defined context of use. Designating a "system of systems", an avionics system is "qualified", that is to say has a demonstrated performance level, for a given environment (the final performance levels thereof will conform to the expected performance levels and do so in the a priori defined context of use). The demonstrated performance levels of a qualified/certified system comprise in particular the response times (perceived from outside the system, peripheral systems or by the human being). A flight management system generally comprises steps of scheduling the real-time tasks of a given resource, in order to meet these response time requirements with a required probability threshold.

An open F.M.S. is generally characterized by a list of accessible interfaces (for access), available CPU cycles allocated to the different clients and various mechanisms in terms of quality of service or QoS (e.g. accuracy of the calculations, available memory, accuracy/reliability trade-off, etc.). Regarding the calculations, an avionics flight management system can comprise a mechanism for managing tasks with dynamic priority, by using in particular the measured average free time (i.e. average "IDLE" time, residual time available for a system whose intrinsic performance levels cannot a priori be measured). The quality of service implemented in an F.M.S. can notably take account of the size of the integration step, the number of iterations for iterative calculations, the number of elements calculated, the temporal depth of the calculation, the mantissa of the floating point number, the order of development for the non-linear functions, the interpolation level, complexity of the modellings used (WGS84 versus Mercator local), trajectory calculation classes (e.g. with or without turns).

In one embodiment, the method according to the invention comprises one or more steps out of the steps described below.

In a first step not represented, a non-optimal flight plan (or a trajectory, for example 3D) is received or determined.

In the step 310, a flight plan is determined or received. This flight plan can be a current flight plan but not necessarily (it can be a revised flight plan). In one embodiment, a second computer 302 (of low criticality or non-avionics) receives or recovers a flight plan to be optimized, from one or more data sources. A data source can be a system with high criticality 301 such as, for example, a flight management system F.M.S.

A reception operation can be triggered automatically and/or manually (e.g. push sending and/or pull sending, at regular intervals or on request, on the part of a machine and/or the pilot, on request from air traffic control, etc.).

From this flight plan, a plurality of flight plan revisions is determined or calculated or generated or estimated. These revisions can be predefined (e.g. known from a database, received from a third-party module, directly or indirectly determined by the pilot, etc.) or determined dynamically, for example as a function of the flight context. The plurality of revisions is generally generated combinatorially (either "blind" or by upstream integration of the essential data so as not to generate flight plans that cannot be flown downstream).

In other words, the server 302 can determine and/or receive individual revisions (also called "opportunities" inasmuch as such revisions can require the agreement of air traffic control to be implemented effectively) then determines combinations of revisions or individual opportunities. Incidentally, it should be noted that, optionally, control (i.e. feedback) loops can be incorporated in one or more of the steps of the method according to the invention. Air traffic control ATC, represented by a human controller and/or professional rules, can in fact interact at various steps of the method (from the combinatorial generation of the revisions in order to frame the latter, to the selection, the filtering, the scoring or even the classification of the revisions). In some embodiments, there is not default incorporation with the ATC systems; in others, however, the interactions can be finely integrated (i.e. intensification and automation of the aircraft-control exchanges).

After generation, the different combinations of revisions are selected, in different ways. Different selection methods can be used (in particular learning, or machine learning methods, whether supervised or not, etc.), at step 320. The selection will be able in particular to favour the opportunities which are most often chosen by the pilot or the crew. Among the selection methods, "strategies" 331 will be able to be used, comprising data and/or logic rules. These strategies are representative of the "company policy". They generally comprise data (i.e. factual data, thresholds, numeric values, heuristics, tables, databases, criteria or categories of data, etc.) and/or logic rules (e.g. fuzzy logic, Boolean logic rules, regular expressions, equations, artificial intelligence, etc.). The data and/or rules can be predefined and/or dynamically defined.

The strategies 331 representative of the "company policy" which make it possible to establish that a given revision constitutes a better choice than another revision can be particularly complex. The choice of the revisions and their weighting are representative of the company policy, in the broad sense. The airline can choose to prioritise certain criteria over others. In one embodiment, the criteria are predefined and comprise one or more criteria selected from: the fuel costs, the flight time and its punctuality, the operational flight cost, the availability of the personnel, the availability of the aeroplanes and of the maintenance equipment, environmental criteria, observance of company (AOC) and regulatory (ATC) rules, the facility to implement (AOC and/or ATC negotiation, pilot workload), the reduction of the meteorological risks, the reliability of the revision in time, the air spaces to be avoided. This list is not exhaustive.

In one embodiment, a selection of the revisions can be automatic and/or manual. The pilot can choose combinations of particular revisions). For example 4D constraints (lateral, vertical, temporal, speed) can be eliminated and/or inserted and/or modified on one or more points of the flight plan. The flight plan data in general can be modified (for example designation of an alternative airport, entry of an arrival or departure procedure, offset overfly, etc.).

The selection can also take account of a history or static information (optionally improved by continuous learning) bearing notably on the negotiations conducted with the air traffic control authorities (comprising, for example, information regarding successes, failures, the reliability of the revisions accepted over time, etc.).

In some embodiments, the selection of the revisions and of their combinations can be assessed or pre-filtered. For example, the "non-negotiable" flight plans can be eliminated. Flight plans can be rejected or disregarded because they do not—or will not—satisfy mandatory or imperative criteria to be able to authorize the modification of the flight plan. For example, some candidate flight plans may not satisfy conditions emanating from non-avionics or off-avionics databases (e.g. passage through closed air spaces, time of arrival too late, personnel not available, etc.).

Optionally, indications concerning the facility to negotiate individual revisions and their combinations can be supplied to the pilot. For example, combinations of individual revisions can be predetermined (also adjusted using historical analyses or feedback from all or some of the flights previously carried out).

In one embodiment, the method can comprise one or more steps consisting in particular in calculating the gain (or benefit) from a so-called individual revision relative to one or more predefined criteria (just one, some or all of the criteria). The gain can be assessed by the application of a weighted combination of criteria. The assessment can be local and/or global. For example, the assessment can determine, for each individual revision, what flight plan points are specifically impacted (for a given criterion or a combination of such criteria). This determination can use different thresholdings (one or more predefined thresholds or ranges of thresholds, static or dynamic). The use of local comparisons, possibly thresholded, makes it possible to improve the processing of the data (e.g. navigation data) and the display or visualization thereof. Data processing and visualization steps allow the pilot to better apprehend the distribution along his or her flight plan of the different local impacts of a given criterion or of a weighted combination of specific criteria. These impact calculations can take place upstream (during selections of the revisions) or downstream (after actual avionics calculation, possibly after classification of the viable revisions).

Optionally, the application computer can assess the relevance of the flight plans by associating with them one or more validity times or else by eliminating all or some of the flight plans as a function of one or more current events in the F.M.S. computer, e.g. as a function of a sequencing of a way point, i.e. of a change of active flight plan segment for example, of the sequencing of a characteristic phase of the flight, of a change of state of the aeroplane systems (engine failure for example, icing, pressurization problems, lightning, etc.).

One or more flight plans corresponding to different combinations of revisions having been finally determined and/or selected, the gateway to the avionics world will be able to be used.

For a given flight plan with N constraints 330 (there can be M flight plans manipulated), an avionics calculation 340 ("qualified", "certified", "official") is carried out. In other words, one or more of these (candidate) flight plans is/are calculated or manipulated by the flight management system F.M.S. 301, which determines the qualified avionics parameters ("parameters" hereinbelow) thereof.

In one embodiment, the application server 302 communicates a request to the F.M.S. computer 301, for example in order to apply the strategies retained (combinations of individual opportunities) selected in the active or current flight plan of the aircraft. In a subsequent step, the F.M.S. computer 301 determines all the data associated with the flight plan thus communicated (by therefore using its internal algorithms qualified or certified by the regulator). The data comprise for example predictions in terms of fuel consumption or of times of passage, etc.

More generally, the qualified avionics parameters can for example comprise predicted data on altitude, speed, fuel, time of passage, weather forecasts, but also geographic zones (latitude/longitude), waypoints or the lateral trajectory that links these points, characteristic points of the flight of the aircraft (e.g. end of climb/start of cruising "Top of Climb", end of cruising/start of descent "top of Descent", points of the flight corresponding to certain characteristic altitudes of passage (like the speed limit altitude for noise reduction "Speed Limit Altitude", the acceleration level altitude on takeoff (ACCEL ALT), the level altitude preceding landing ("Final Capture Altitude"). These parameters can also comprise data representing the state of the aeroplane (e.g. predicted fineness, economic speed according to the flight phases, aeroplane and freight weights, flight optimization criteria, e.g. "Cost Index", information on the state of the engines (e.g. wear, failures, state of the aerodynamic structure, e.g. drag coefficient due to friction(s)).

The calculations of avionics nature can produce a certain number of results, which can be variously analysed and processed downstream (by non-avionics, i.e. non-qualified, systems).

In one embodiment, the computer 302 receives or recovers the calculations performed by the F.M.S. computer. The calculations are analysed, and possibly filtered. The flight plans which do not observe the so-called "strict" constraints can for example be eliminated (or disregarded). The computer 302 compares the different flight plans, as calculated by the critical F.M.S. system 301.

The results of the avionics calculations can, in a particular case, be sorted and/or ordered and/or classified and/or assessed according to various modalities, in particular in light of predefined scoring criteria.

In one embodiment, for a flight plan characterized by N constraints, then the impact of each constraint can be assessed (step 340). In one embodiment, the step 340 can in fact be iterative and/or make it possible to explore the combinatorial aspect (revisions upstream of the avionics calculations, constraints downstream of the avionics calculations), see FIGS. 4 and 5.

Optionally, in some embodiments, the flight plans having been characterized by the avionics (e.g. by the computer 301) can be filtered and/or classified in the step 360.

In one embodiment, an overall gain and/or one or more local gains can be determined. For example, steps of the method can make it possible for the pilot to classify the different zones of the flight plan, by estimating the point at which each zone participates (positively or negatively) in the observance of a criterion, of several weighted criteria or of all the weighted criteria. The pilot having preprocessed information available will for example be able to choose to negotiate as a priority the revisions in said zone. The filtering and/or the classification can be global (e.g. concerning a flight plan as a whole) or local (e.g. according to one or more of the properties of these flight plans). For example, some possible flight plans can be eliminated globally (e.g. according to imperative criteria, and/or flight events and/or time and/or space validity intervals, etc.). In another example, a flight plan can be scored (in absolute terms) or classified (relative to other candidates), for example in relation to the company policy defined upstream (e.g. by weighted combination of predefined criteria). In one development, each revised flight plan is associated with one or more scores (or amounts). A score can be local or individualized (e.g. by criterion). A global score can be determined (for example in relation to the overall airline policy).

In one embodiment, the scoring or classification or filtering criteria can be configurable. For example, the pilot can weigh the absolute and/or relative scoring criteria, according to his or her preferences. The classification criteria can also be predefined by the airline. The criteria or the weighting of these criteria can be configured by man (i.e. the pilot or the airline) and/or machine (e.g. a third-party system assessing these criteria). The criteria can be static (e.g. invariant over time or a flight) or else be dynamic (e.g. evolve during the flight, for example as a function of the flight context). A part of the criteria can be configurable and/or dynamic (whereas another part will be non-configurable and static). For example, in one embodiment, a weighting for short-haul flights of "shuttle" type between airports (prioritizing punctuality for questions in order to maximize the number of rotations) will be different from a long-haul weighting prioritizing the fuel consumption and avoiding random weather events for passenger comfort.

Optionally, in some embodiments, in the step 370, a revised flight plan out of these flight plans classified according to different criteria can be displayed graphically and/or selected (by man and/or machine).

For example, the compared and classified flight plans can be displayed to the pilot, according to different rendering modalities (visual and/or auditory and/or haptic) by using one or more devices (e.g. screens, projectors, tablets, etc.). The pilot can then select a particular revised flight plan, thus being assisted in his or her decision-making by data processing operations performed upstream. In an alternative, competition between algorithms executed by third-party systems is also possible to automatically select the best solution. In one alternative, the selection can be a combined man-machine selection.

In some embodiments, the method can comprise steps consisting in determining then displaying graphically the different impacts of the different constraints (e.g. to the pilot). For example, in the case where a flight plan with N constraints has led to the assessment of all the flight plans of N−1 constraints, it is possible to represent the participation of each constraint in the overall scoring of the flight plan. In particular, constraints or revisions can be revealed that are likely to be rejected by air traffic control or, on the contrary, revisions that are innovative or offer significant gain (e.g. as to the reliability of the weather information) can be revealed.

Subsequently, after selection, a final flight plan (qualified from the avionics point of view, optimizing the observance of the company policy, etc.) can be implemented in the step 380, this flight plan by turns generated, filtered, assessed, calculated, classified then selected as active, temporary or secondary (working, inactive) flight plan. For example, the pilot can optionally ask the computer 302 to "insert" or "inject" the selected flight plan into the F.M.S. computer 301. The term "insert" means validating the flight plan modification in the qualified F.M.S. computer. At this stage, the selected revised flight plan has not yet replaced the target flight plan of the F.M.S. (being able to be the so-called current or active flight plan, the temporary flight plan or a working (secondary) flight plan).

These steps 370 and/or 380 can optionally make it possible to improve the knowledge base through learning.

Optionally, the application computer can save the selection made by the pilot in order to enrich a knowledge base intended for automatic learning. A feedback loop can also make it possible in return to improve the revision (revision combinations) strategy selection steps, for example by analysis of the history of the revisions that have been negotiated (i.e. validated) successfully.

In one or more steps (not represented), the pilot or the crew can "negotiate" the revised flight plan with the air navigation control authorities. Once validated by the pilot, the latter generally discusses orally by radio channel and/or by digital communication channel (by so-called datalink channel) the possibility of making the proposed revision truly effective. Air traffic control can accept or reject the revision. The currently human negotiation, performed on an ad hoc basis in time and each time relating to a revision could tomorrow be partially automated, intensified in terms of negotiation frequency and covering multiple sub-objects (finer granularity).

Advantageously according to the invention, the pilot is aided or assisted in his or her negotiation with air traffic control. For example, the pilot will be able to choose a revision (or combination of revisions) from which to begin, by analysing the best tradeoff between added value (for the aircraft, the passengers, the airline) and the negotiation "difficulty". The negotiation will be able to be performed according to different modalities including voice for example or, more generally, by means of the systems offered to the operators (e.g. uplink/downlink datalink with ATC).

Once the final flight plan is accepted by air traffic control, the pilot can send a command or a request to effectively fly the revised flight plan.

Advantageously according to the invention, if necessary, the flight plan (by turns determined, selected, negotiated, validated and activated) inherits properties or attributes from an F.M.S. native flight plan through its construction.

Figure 4:
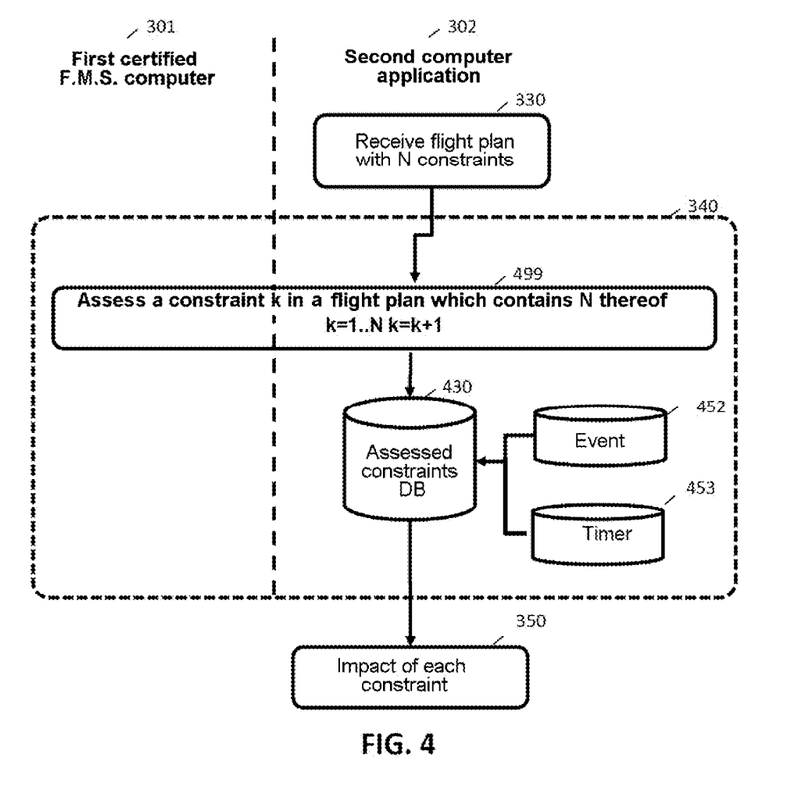
FIG. 4 details an embodiment for assessing the impact of a constraint k in a flight plan which contains N constraints.

FIG. 4 details an embodiment of the invention for assessing the impact of a constraint k in a flight plan which contains N constraints.

A flight plan can in fact be considered as an object or set of N constraints (e.g. lateral, vertical, flight performance levels and envelope). This object with N constraints is received and/or determined in the step 330.

The initial object can be manipulated by the avionics computer in its entirety (i.e. with its N constraints), but the critical and qualified resources of the latter can be made to contribute or exploit it to manipulate objects modified or derived from this initial object with N constraints. Objects derived from this flight plan are created and manipulated in the step 340.

The step 340 of avionics manipulation of the derived flight plans can comprise different sub-steps, depending on the embodiments.

The step 340 can in particular comprise a step 499 of assessment of a constraint k in a flight plan which contains N thereof (k varying from 1 to N). This step 499 can be repeated.

After determination of the derived objects, the computer 301 calculates all the data or parameters associated with the different flight plans (with certified internal algorithms). The data are for example predictions on fuel, times of passage, etc.

All of the data (e.g. assessed constraints) can be stored in a database 430.

These assessed constraints can be selected or modified by the application of different events 452 or time constraints 453 (for example, flight plans which would not observe strict constraints would be eliminated). In other words, optionally, the computer 302 can manage the relevance of the proposed flight plans by associating with them, for example, a validity time, or by eliminating flight plans on F.M.S. event or not (the aeroplane has sequenced a point for example). The method for generating or selecting revisions can be improved in return.

The impact of each constraint can be individualized or quantified or estimated or costed or revealed in the step 350. The computer 302 can in fact assess the impact on the flight plan of each constraint. If the scoring model is a cost model, the computer can for example assess the unitary cost of each constraint, a unitary cost which, once integrated over all of the flight plan can give the overall flight cost.

In subsequent steps not represented, the pilot assisted by the upstream assessments can visualize the most favourable and/or the least favourable zones of his or her flight plan (sets of flight points). The pilot can then negotiate in full knowledge of the facts with air traffic control ATC to optimize the flight of the aircraft. A plan with i constraints being validated by the air traffic control authorities, the pilot can insert the revision into the current flight plan of the aircraft and effectively fly this revised flight plan.

Figure 5:
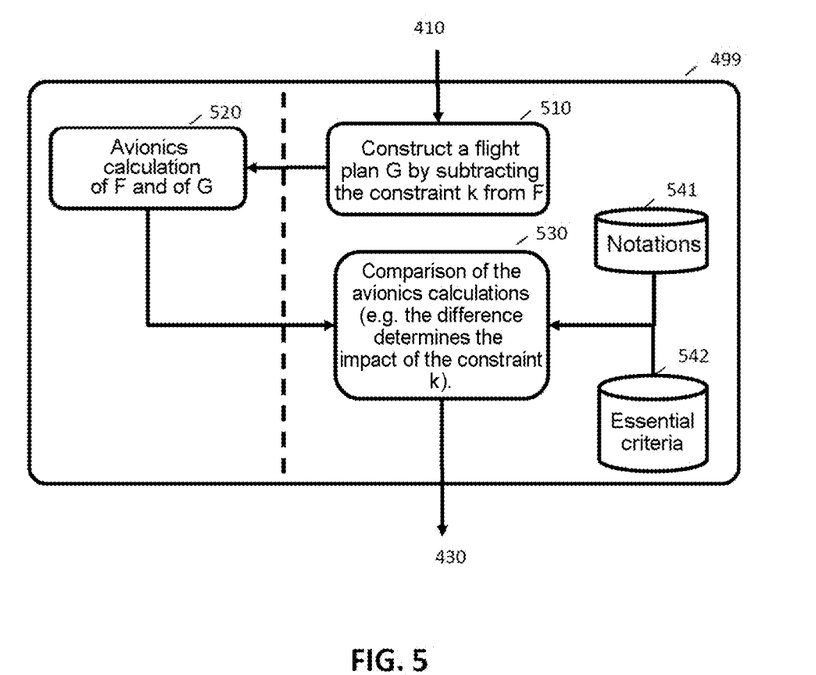
FIG. 5 details an embodiment for assessing a constraint k in a flight plan which contains N constraints.

FIG. 5 details an embodiment for assessing a constraint k in a flight plan which contains N constraints.

In one embodiment, derived flight plans can in particular result from the subtraction of one or more constraints, which makes it possible after the event (after qualified avionics calculation) to assess the cost or the impact of one or more constraints having been subtracted. This derived object creation can be performed in practice by the server 301, but it can also be undertaken by the computer 302 (or a combination).

In the step 510, in one embodiment, the number of constraints is progressively decremented (i.e. a constraint is progressively removed). For example, the computer 302 can invoke the F.M.S. to calculate N flight plans, each flight plan being the initial flight plan from which a constraint is removed. In other words, the parameters associated with a flight plan with N constraints, and then with N−1 constraints, are successively calculated. In one embodiment, the constraints are removed in succession (first of all, the parameters are determined that are associated with a flight plan with N constraints, then with N−1 constraints, then with N−2 constraints, and so on to a flight plan with a single constraint). The combinatorial system can thus be significant since it is possible, on each iteration k, to remove one out of k−1 constraints.

In a variant embodiment, the removals of constraints are performed in such a way as to cover all the possibilities (all the combinations). Such a brute force approach is possible, especially with a small number of constraints, but the combinatorial exploration can be optimized or guided in some cases (large number of constraints).

In a variant embodiment, the constraints are removed in parcels of N coherent constraints or constraints of the same nature (or category). For example, in one embodiment, the altitude, speed or time constraints will be able to be removed as a priority and/or first. In another embodiment, determined particular constraints will be removed from a phase of the flight (e.g. climb, cruising, descent). In some embodiments, the air space constraints will be able to be removed or disregarded. In yet other embodiments, all or some of the constraints in terms of operation cost will be able to be set aside. Sets of constraints will be able to be grouped and disregarded combinatorially. Scoring methods will be able to be implemented to explore and/or reduce the possible combinations and make the calculations converge.

In the step 520, a derived object or flight plan, for example G, is created by removing a constraint k from the flight plan F. The two flight plans F and G are transmitted and manipulated by the avionics computer (if the assessment of F already exists, this step can be disregarded).

In the step 530, the difference between the results determines the assessment of the impact of the constraint k.

Other embodiments are described hereinbelow.

In one embodiment of the invention, revisions or combinations of revisions are determined or updated as a function of the flight context. Similarly, the steps consisting in generating, combining, filtering, assessing, classifying, selecting the revisions (or the combinations of revisions) and/or the operations conducted on the results of the avionics calculations can be performed by taking account of this flight context.

A "flight context" of the aircraft corresponds in particular to one of the phases of take-off, climb, cruising, approach, descent, etc. Advantageously, the taking into account of the flight context to determine the selection of the revisions and/or combinations of revisions makes it possible to optimize the use of the accesses to the critical avionics core. The method according to the invention can comprise logic methods or steps that make it possible to determine the "flight context" or "current flight context" of the aircraft. The flight context at a given moment incorporates all the actions taken by the pilots (and in particular the effective piloting setpoints) and the influence of the outside environment on the aircraft. A "flight context" comprises, for example, one situation out of predefined or pre-categorized situations associated with data such as the position, the flight phase, the weighpoints, the current procedure (and others). Moreover, the current "flight context" can be associated with a multitude of attributes or of descriptive parameters (current weather conditions, traffic status, status of the pilot comprising for example a stress level as measured by sensors, etc.). A flight context can therefore also comprise data, for example filtered by priority and/or founded on flight phase data, meteorological problems, avionics parameters, ATC negotiations, anomalies associated with the flight status, problems associated with the traffic and/or the relief. Examples of "flight context" comprise, for example, contexts such as "cruising speed/no turbulences/pilot stress nominal" or else "landing phase/turbulences/pilot stress intense". There can be specific rules in certain contexts, in particular emergencies or critical situations. The context categories can be static or dynamic (e.g. configurable). The method can be implemented in a system comprising means for determining a flight context of the aircraft, said determination means comprising in particular logic rules, which manipulate values as measured by physical measurement means. In other words, the means for determining the "flight context" comprise system or "hardware" or physical/tangible means and/or logic means (e.g. logic rules, for example predefined). For example, the physical means comprise the avionics instrumentation proper (radars, probes, etc.) which make it possible to establish factual measurements characterizing the flight. The logic rules represent all the processing operations on the information that make it possible to interpret (e.g. contextualize) the factual measurements. Some values can correspond to several contexts and by correlation and/or calculation and/or simulation, it is possible to decide between candidate "contexts", by means of these logic rules. A variety of technologies makes it possible to implement these logic rules (formal logic, fuzzy logic, intuitional logic, etc.).

The delimitations of scope in the present document (e.g. "first computer", "second computer") should not be interpreted as limiting, at least in space. A computing system can be distributed in the physical space. The terminology employed refers to distinctions of a logical nature. Thus, an F.M.S. computer will be able to correspond to a rack-mounted server whereas the application computer will be able to correspond to a multitude of electronic circuits distributed in space (e.g. rack, also tablet of E.F.B. type, computing resources accessed remotely, etc.).

The invention can be implemented from hardware and/or software elements. It can be available as computer program product on a computer-readable medium. The medium can be electronic, magnetic, optical or electromagnetic. The device implementing one or more of the steps of the method can use one or more dedicated electronic circuits or a general-purpose circuit. The technique of the invention can be implemented on a reprogrammable computation machine (a processor or a microcontroller for example) running a program comprising a sequence of instructions, or a dedicated computation machine (for example a set of logic gates such as an FPGA or an ASIC, or any other hardware module). A dedicated circuit can in particular accelerate the performance levels in terms of access and of execution of the avionics services. As an example of hardware architecture suited to the implementation of the invention, a device can comprise a communication bus to which are linked a central processing unit or microprocessor (CPU, acronym for "Central Processing Unit"), which processor can be "multi-core" or "many-core"; a read-only memory (ROM) capable of containing the programs necessary for the implementation of the invention; a random access memory or cache (RAM) comprising registers suitable for saving variables and parameters created and modified during the execution of the abovementioned programs; and a communication or I/O (Input/output) interface suitable for transmitting and receiving data. In the case where the invention is implanted on a reprogrammable computation machine, the corresponding program (that is to say the sequence of instructions) can be stored in or on a removable storage medium (for example a flash memory, an SD card, a mass storage means such as a hard disk e.g. an SSD) or on a non-removable, volatile or non-volatile storage medium, this storage medium being partially or totally readable by a computer or a processor. The telecommunication network can be 2G, 3G, 4G, Wifi, BLE, optical fibre of proprietary type or based on a combination of these networks. The reference to a computer program which, when it is run, performs any one of the functions described previously, is not limited to an application program running on a single host computer. On the contrary, the terms computer program and software are used here in a general sense to refer to any type of computing code (for example application software, firmware, microcode, or any other form of computer instruction) which can be used to program one or more processors to implement aspects of the techniques described here. The computing means or resources can be centralized and/or distributed (Cloud computing), possibly with or according to peer-to-peer and/or virtualization and/or redundancy technologies. The software code can be executed on any appropriate processor (for example a microprocessor) or processor core or a set of processors, whether provided in a single computation device or distributed between several computation devices.

The invention claimed is:

1. A method for managing revision of a flight plan of an aircraft implemented by at least two systems, a first of the systems being a flight management system (FMS) of avionics type and a second of the systems interacting with the first system being of non-avionics type, the method comprising:
receiving a flight plan associated with N constraints;
in the second, non-avionics system, determining a plurality of revisions of the flight plan received, each revision being associated with up to said N constraints;
in the first, avionics system, determining avionics parameters corresponding to revised flight plans associated with different combinations of the determined revisions each combination of revisions leading to the association of a revised flight plan with N–k constraints among said N constraints, k varying from 1 to N–1; and
in the second, non-avionics system, comparing the determined avionics parameters and assessing an impact of at least one revision of the flight plan,
wherein a machine learning model is used to determine at least one combination of the determined revisions that reduces negotiation time, with an air traffic control (ATC) authority, by an amount that satisfies a criterion, said machine learning model being trained using a historical database comprising previously performed revisions of flight plans associated with negotiation times;
said method further comprising using said machine learning model to predict, respectively for a plurality of zones of the flight plan, a plurality of local scores estimating the impact of each zone on the negotiation time.

2. The method according to claim 1, wherein at least one of the combinations is determined as a function of predefined criteria.

3. The method according to claim 1, further comprising: quantifying and displaying an impact of a revision of the received flight plan.

4. The method according to claim 1, further comprising:
receiving a selection of one revised flight plan out of several, the selected flight plan comprising a particular combination of revisions.

5. The method according to claim 1, further comprising:
sending to the ATC authority a request to authorize flying a flight plan associated with a particular combination of revisions.

6. The method according to claim 1, further comprising:
inserting a selected and/or authorized flight plan into the first system.

7. The method according to claim 1, wherein a number of constraints of the flight plans is progressively decremented.

8. The method according to claim 1, wherein a number of constraints of the flight plans is progressively decremented, in a predefined order as to a nature of the constraints.

9. The method according to claim 1, further comprising:
assessing an impact of a previously selected constraint.

10. A non-transitory, computer-readable memory comprising instructions making it possible to perform the method according to claim 1, when said instructions are executed on a computer.

11. A system for implementing the method according to claim 1, comprising an FMS of avionics type.

12. The system according to claim 11, further comprising:
a non-avionics system of electronic flight bag (EFB) type, or a digital tablet or an aircraft operations center (AOC)/ATC equipment item.

* * * * *